US005883327A

United States Patent [19]

Terada et al.

[11] Patent Number: 5,883,327

[45] Date of Patent: Mar. 16, 1999

[54] KEYBOARD SYSTEM FOR AN ELECTRIC MUSICAL INSTRUMENT IN WHICH EACH KEY IS PROVIDED WITH AN INDEPENDENT OUTPUT TO A PROCESSOR

[75] Inventors: Kosei Terada; Keigo Kikuchi; Masahiko Kobayashi, all of Hamamatsu, Japan

[73] Assignee: Yamaha Corporation, Japan

[21] Appl. No.: 988,170

[22] Filed: Dec. 9, 1992

[30] Foreign Application Priority Data

Dec. 11, 1991 [JP] Japan .................................... 3-351061

[51] Int. Cl.$^{6}$ ................................ G10H 5/00; H04Q 1/18

[52] U.S. Cl. .................................. 84/653; 84/678; 84/744

[58] Field of Search .............................. 84/744, 745, 653, 84/678, DIG. 7

[56] References Cited

U.S. PATENT DOCUMENTS 4,106,383 8/1978 Dittmar ..................................... 84/615
4,194,425 3/1980 Kitagawa .................................. 84/684
4,416,182 11/1983 Wise et al. ............................. 84/470 R
4,599,930 7/1986 Takahashi ................................. 84/687
4,979,423 12/1990 Watanabe .................................. 84/690
5,151,554 9/1992 Matsuda .................................... 84/655

FOREIGN PATENT DOCUMENTS 62-159183 7/1987 Japan .

*Primary Examiner*—William M. Shoop, Jr.
*Assistant Examiner*—Jeffrey W. Donels
*Attorney, Agent, or Firm*—Graham & James LLP

[57] ABSTRACT

A keyboard system for an electronic musical instrument includes: a keyboard having a number of keys; a keyboard central processing unit (CPU) coupled to the keyboard; a switch connected to each key on the keyboard; a pull-up resistor serially connected to each switch; a unit for applying voltage to a serial circuit of each switch and each pull-up resistor; and a unit for parallel supplying a signal at an intersection point between each switch and each pull-up resistor to the CPU. The operation states of a plurality of keys can be independently detected by sequentially detecting the potential at the interconnection points.

13 Claims, 11 Drawing Sheets

KEYBOARD SYSTEM FOR AN ELECTRIC MUSICAL INSTRUMENT IN WHICH EACH KEY IS PROVIDED WITH AN INDEPENDENT OUTPUT TO A PROCESSOR

BACKGROUND OF THE INVENTION a) Field of the Invention

The present invention relates to a keyboard system for electronic musical instruments, and more particularly to a keyboard system for electronic musical instruments each key of which has a contact switch.

b) Description of the Related Art

A keyboard type electronic musical instrument uses a keyboard for designating a pitch and the like. It is generally necessary to electrically detect a key depression in order to generate a tone signal corresponding to the depressed key. To this end, each key of the keyboard of an electronic musical instrument has a contact switch. In detecting a depressed key as well as a key speed, a two-make switch is generally used as a contact switch.

A matrix circuit of contact switches are generally used to simplify the wirings of contact switches provided for keys of a keyboard. Namely, a plurality of row lines and column lines are used to form a matrix of intersections, and a switch is connected to each intersection. One two-make switch is connected at two intersections.

FIG. 2 shows a conventional contact switch circuit for the keyboard of an electronic musical instrument. A plurality of row lines $X_0, \ldots, X_{15}$ form power supply lines, and a plurality of signal lines (column lines) $Y_0, \ldots, Y_{15}$ are intersecting with the row lines $X_0, \ldots, X_5$. Serially connected to the column lines $Y_0, \ldots, Y_{15}$ are pull-up resistors $R_0, \ldots, R_{15}$ whose other ends are grounded.

At each intersection between the row lines $X_0, \ldots, X_{15}$ and column lines $Y_0, \ldots, Y_{15}$, a serial circuit of a diode D and a switch SW is connected. When a switch SW is closed, a voltage applied to the row line X causes current to flow from the row line X to the diode D, switch SW, pull-up resistor R, and to ground. Therefore, a voltage appears on the corresponding column line Y to generate an output signal.

If the diode D is not connected at each intersection and a plurality of switches SW are closed at the same time, current may flow reversely resulting in a possibility of erroneous recognition that a switch which is not closed actually is recognized as being closed.

For example, as shown in FIG. 2, assuming that the switches at the intersections between the row line $X_3$ and column line $Y_{10}$, row line $X_7$ and column line $Y_{10}$, and row line $X_7$ and column line $Y_5$ are closed at the same time when a voltage is applied to the row line $X_3$ and diodes are not provided, then the voltage is also applied to the column line $Y_5$ via the closed switch at the intersection between the row line $X_7$ and column line $Y_5$. Namely, the switch at the intersection between the row line $X_3$ and column line $Y_5$ is erroneously recognized as being closed. For this reason, a diode for preventing reverse current is required at each intersection.

In the contact switch circuit shown in FIG. 2, it is possible to detect the close state of each of 256 switches provided for 16×16 row and column lines. If a two-make switch is used for each key of a keyboard, one key is assigned to two intersections of the matrix shown in FIG. 2.

Recently, an electronic musical instrument uses a central processing unit (CPU) for its main body and another CPU for its keyboard. The keyboard CPU detects each event at the keyboard, processes the detected event in the form of proper signals, and sends them to the main CPU.

SUMMARY OF THE INVENTION

It is an object of the present invention to provide a keyboard system for electronic musical instruments capable of detecting the close state of each of a number of contact switches provided for keys of a keyboard, without using diodes.

According to one aspect of the present invention, there is provided a keyboard system for an electronic musical instrument comprising: a keyboard having a number of keys; a central processing unit connected to the keyboard; switching means coupled to each key of the keyboard, a pull-up resistor serially connected to each switching means; means for applying voltage to a serial circuit of each switching means and each pull-up resistor; and means for parallel coupling a signal at an interconnection point between each switching means and the pull-up resistor to the central processing unit.

A switch connected to each key of the keyboard is directly connected to the pull-up resistor, without using a diode.

It is therefore possible to dispense with a number of diodes and the related wiring labor for the diodes.

The interconnection point between each switch and each pull-up resistor is connected to the central processing unit (CPU) so that voltage appearing across the pull-up resistor can be detected.

As a result, a depression of a key among a number of keys of the keyboard can be reliably detected.

Although the number of wirings between keys of the keyboard and CPU increases, such wirings can be made without any great difficulty, because a limit of the number of pins of a today's sophisticated CPU has been alleviated.

Signal processing by CPU can be easily performed by dividing a number of keyboard keys into groups and time-divisionally detecting a key depression/release in unit of each group.

Since the keyboard CPU is connected to the keyboard, it is unnecessary to increase the number of cables interconnecting the keyboard and external circuits.

According to the present invention, a circuit for detecting the operation state of the keyboard with a number of keys each having a contact switch, does not require to use diodes.

It is therefore possible to reduce the number of components of the circuit for detecting the operation state of contact switches, and to simplify the assembly process of circuit components.

DETAILED DESCRIPTION OF THE PREFERRED EMBODIMENTS

Figure 1A:
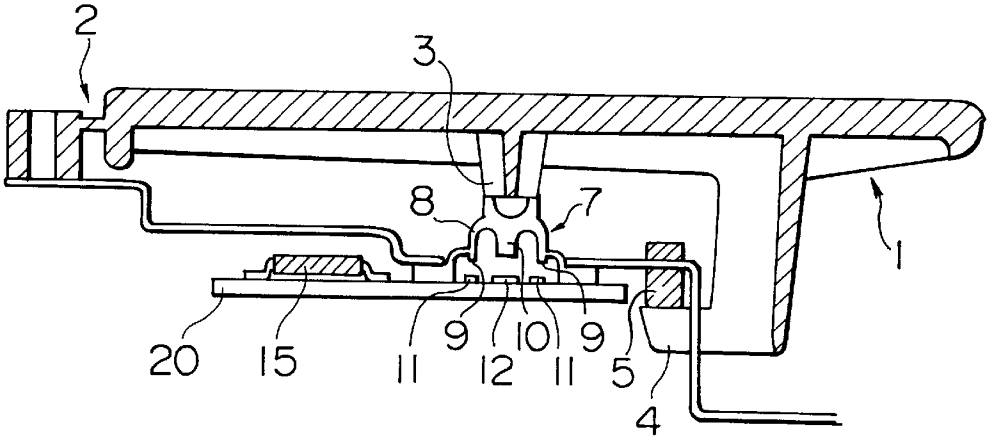
FIGS. 1A and 1B are a cross sectional view and a circuit diagram, showing the keyboard system for an electronic musical instrument according to an embodiment of the present invention.
Figure 1B:
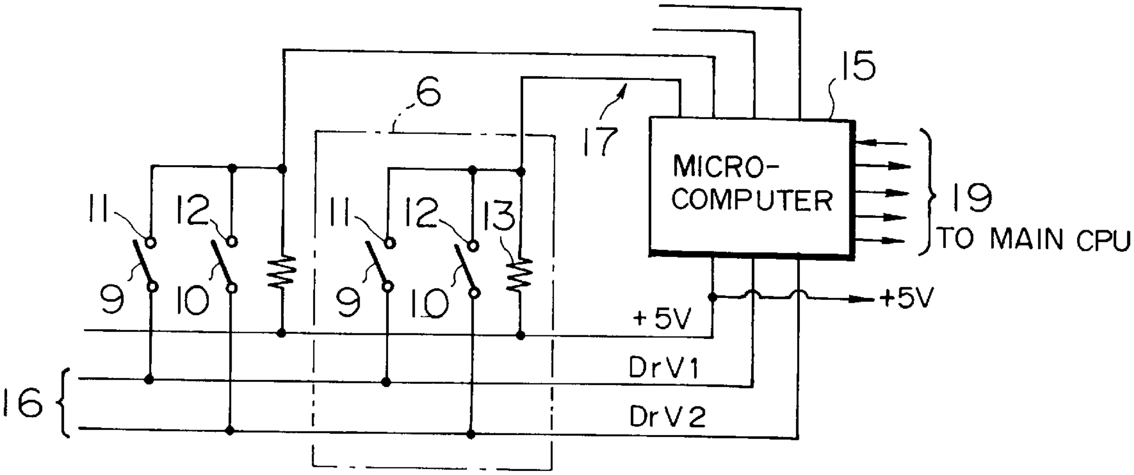
Figure 2:
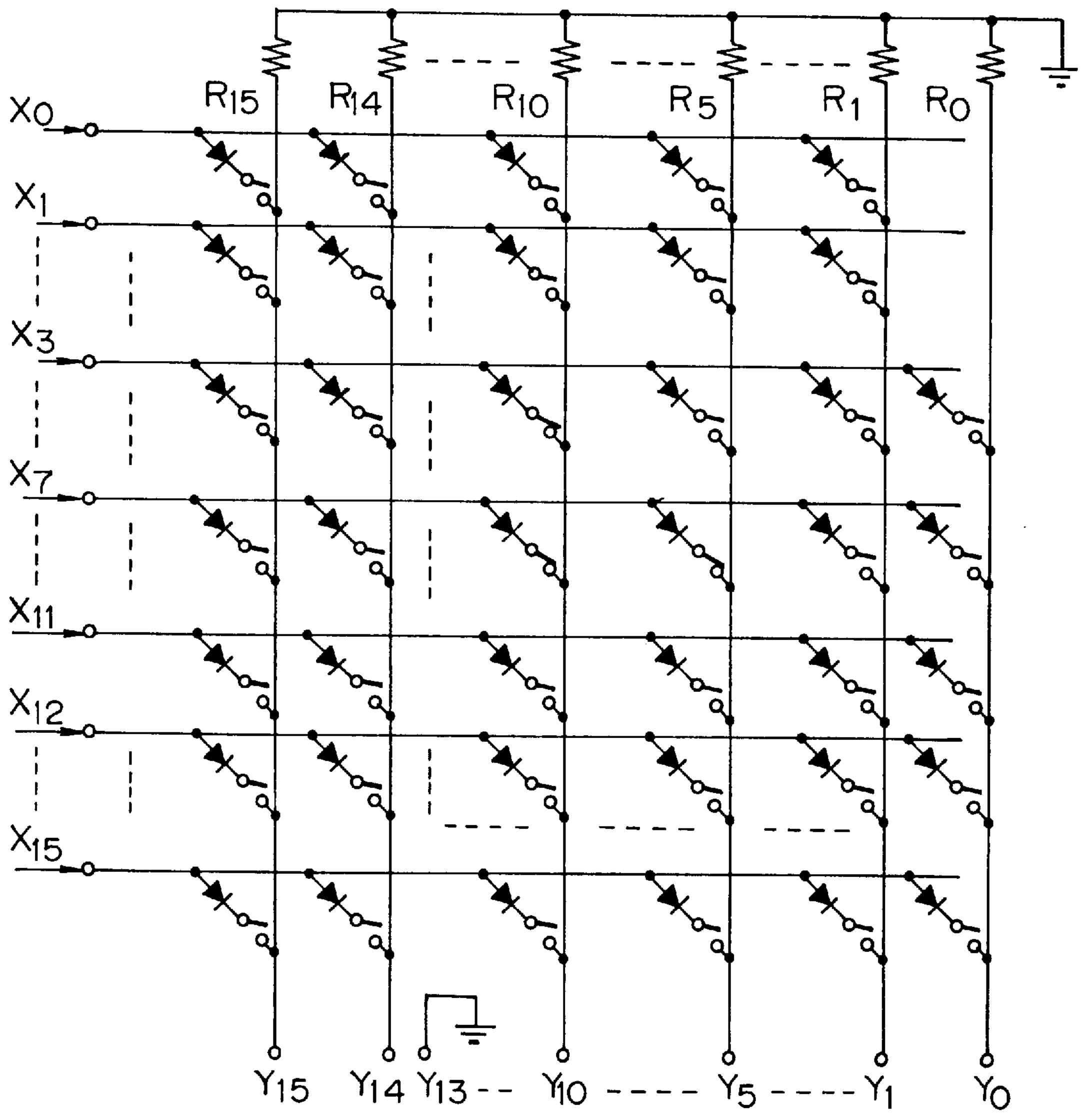
FIG. 2 PRIOR ART
FIG. 2 is a circuit diagram showing an example of a conventional contact switch detecting circuit of a keyboard system for an electronic musical instrument.

FIGS. 1A and 1B show an embodiment of the keyboard system for an electronic musical instrument according to the present invention. FIG. 1A is a schematic diagram showing the structure of a key on a keyboard, and FIG. 1B is a schematic circuit diagram of a keyboard printed circuit board.

Referring to FIG. 1A, a white key 1 is made of plastic and supported by a fulcrum 2 made of resilient member. An actuator 3 is formed on the bottom surface of the white key 1, the actuator being biased upward by a rubber member of a contact switch 7. The white key 1 has a stopper 4 extending downward. The upward movement of the white key 1 is regulated by the stopper 4 when the latter contacts with a limiter 5.

Within the contact switch 7, there are provided first ring contacts 9 and 11 and second contacts 10 and 12 formed at the central area of the switch 7. As the white key 1 is pushed down, the first contacts 9 and 11 become in contact with each other, and then the second contacts 10 and 12 become in contact with each other.

A key depressing speed can be detected basing upon a difference between close timings of the two pairs of contacts, thereby generating a touch signal. A key depression signal can be generated by detecting a close state of one of the pairs of contacts, e.g., the first contacts, thereby generating a pitch signal.

The contact switch 7 is mounted on a keyboard printed circuit board 20 on which resistors (not shown) for respective keys and a keyboard microcomputer 15 are mounted. The microcomputer 15 includes a CPU, ROM, RAM, timer, and the like.

The outline of the circuit structure of the keyboard printed circuit board 20 is shown in FIG. 1B. Key circuit units 6 for respective keys are connected in parallel to the microcomputer 15 and the power source lines 16. In each key circuit unit 6, a pull-up resistor 13 is connected to a +5 V power source line, the other end of the resistor 13 being connected to the first fixed contact 11 and second fixed contact 12. The first movable contact 9 is connected to a first drive line Drv1, and the second movable contact 10 is connected to a second drive line Drv2.

Therefore, when the movable contact 9 becomes in contact with the fixed contact 11 to close the first contacts, the first drive line Drv1 is connected to the first contacts and the power source line +5 V is connected to the first contacts via the pull-up resistor 13, so that current flows through the pull-up resistor 13.

Similarly, when the movable contact 10 becomes in contact with the fixed contact 12 to close the second contacts, current flows through the pull-up resistor 13. By shifting the timings of activating the two drive lines Drv1 and Drv2, it is possible to detect the close state of the first and second contacts independently.

The interconnection point between the pull-up resistor 13 and the first and second contacts is connected to the microcomputer 15 through signal line 17. The microcomputer 15 is connected to a main CPU of the electronic musical instrument via signal lines 19. The microcomputer 15 processes signals received from the key circuit units 6 through signal line 17, and sends corresponding signals to the main CPU.

Figure 3:
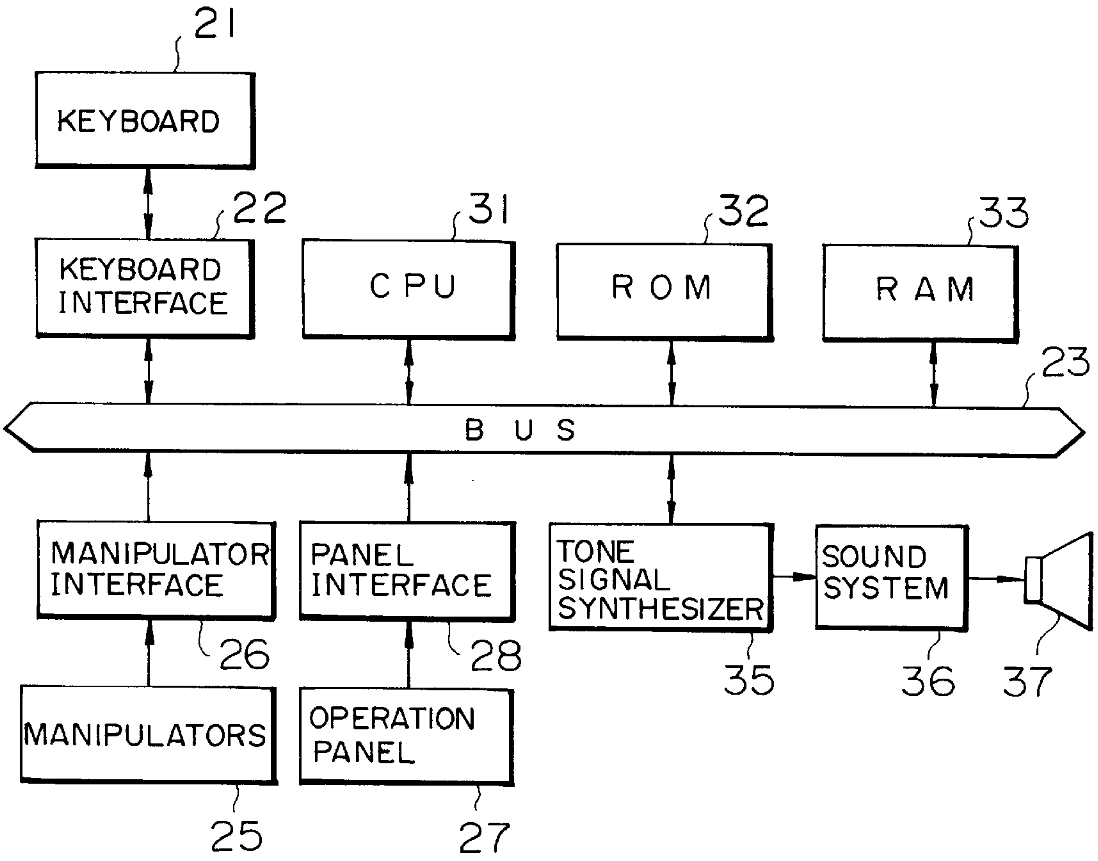
FIG. 3 is a block diagram showing the hardware structure of the electronic musical instrument according to an embodiment of the present invention.

FIG. 3 shows the hardware structure of the electronic musical instrument. The keyboard 21 has a number of white and black keys. Information of key manipulation and the like supplied from the keyboard 21 are sent to a bus 23 via a keyboard interface 22. In addition to the keyboard 21, various manipulators 25 and an operation panel 27 are provided to the electronic musical instrument. An operation of the manipulator 25 is informed to the bus 23 via the manipulator interface 26, and an operation of the operation panel 27 is informed to the bus 23 via a control panel interface 28.

These signals on the bus 23 are received by a CPU 31 which processes them to obtain tone signal generating parameters, and sends the parameters to a tone signal synthesizer 35. The synthesizer 35 generates tone signals and sends them to a sound system 36 which converts the tone signals into analog signals to generate sounds from a loudspeaker system 37.

A ROM 32 stores programs to be executed by CPU 31. A RAM 33 has register areas and the like which are used when CPU 31 executes a program stored in ROM 32.

Figure 4A:
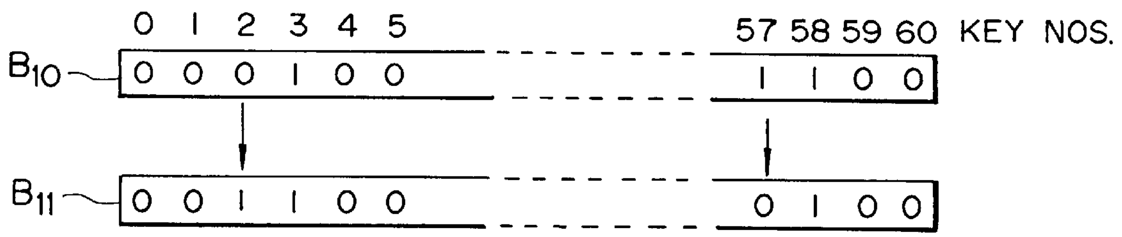
FIGS. 4A to 4D are schematic diagrams showing the structure of registers in RAM shown in FIG. 3.

FIGS. 4A to 4D show examples of registers in RAM 33 shown in FIG. 3. FIG. 4A shows the structure of buffer registers for storing the operation state of the first contacts of the contact switch for each key on the keyboard. First contact buffer registers B10 and B11 store the current and previous operation states of the first contacts, and interchange their functions alternately. The numbers affixed at the upper area of the buffer registers B10 and B11 correspond to the numbers of the keys on the keyboard.

"0" and "1" stored in the register indicate the open and close states, respectively, of the first contacts.

Assuming that the buffer B10 stores the previous state of the first contacts, and that the buffer B11 stores the current state of the first contacts, the buffers indicate in the example shown in FIG. 4A that the key of the key number "2" was depressed newly, and that the key of the key number "57" was released newly.

Figure 4B:
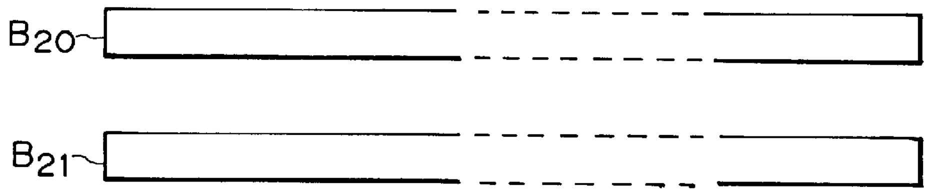

FIG. 4B shows two second contact buffer registers B20 and B21. Similar to the buffers shown in FIG. 4A, these buffers shown in FIG. 4B store the current and previous states of the second contacts. "1" in the buffer indicates that the second contacts of the corresponding key are closed, and "0" in the buffer indicates that the second contacts of the corresponding key are opened.

Figure 4C:
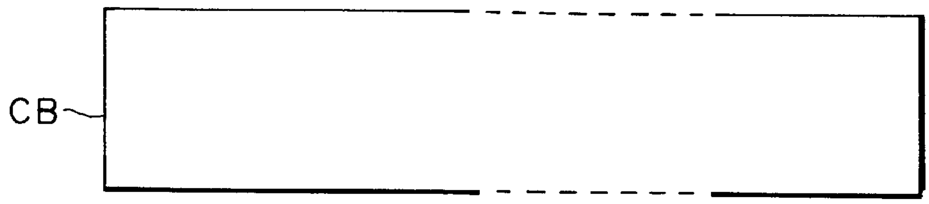

FIG. 4C shows a count buffer register CB. Also in the count buffer register CB, information is stored at the position corresponding to each key. The electronic musical instrument is provided with a running counter which is counting always. When the first contacts are closed, the count of the running counter at that time is stored in the count buffer register at the corresponding position. When the second contacts are opened, the count of the running counter at that time is stored in the count buffer register at the corresponding position.

Figure 4D:
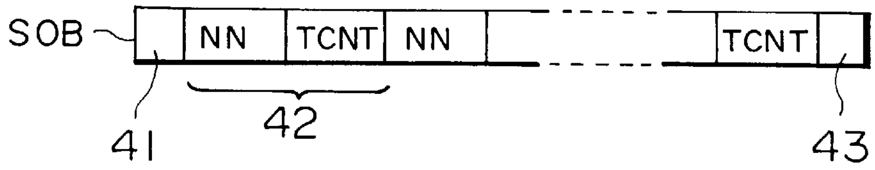

FIG. 4D shows a serial-out buffer SOB for storing a serial-out data sent from the keyboard microcomputer. In the serial-out buffer SOB, a start bit 41 of the serial-out data is stored at the start position, the serial-out data has a stop bit 43 at the end of it. Between the start bit 41 and stop bit 43, data 42 is stored as many times as the number of operated keys, the data being a set of a note number NN representing a pitch of the operated key and a touch count TCNT representing a touch sensitivity.

The operation of the electronic musical instrument having the keyboard system shown in FIG. 1 and the hardware structure shown in FIG. 3 will be described with reference to the flow charts.

Figure 5:
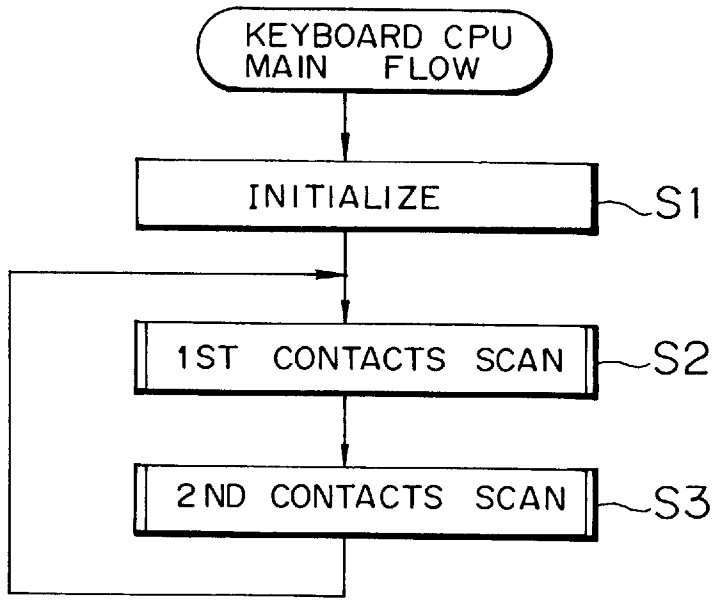
FIG. 5 is a flow chart showing the main procedure to be executed by the keyboard CPU.

FIG. 5 is a flow chart showing the main flow to be executed by the keyboard CPU.

Upon start of the flow, an initialization is executed at step S1, to confirm the connection between the keyboard CPU and main CPU and to execute other necessary operations.

At step S2, the first contact scanning process is carried out to detect the states of the first contacts of all keys. At step S3 the second contact scanning process is carried out to detect the states of the second contacts of all keys. After step S3, the control returns to step S2.

In this flow, although the states of the first and second contacts are detected and the obtained information is properly processed, the information is not sent as yet. Information of an occurrence of a key event or the like is sent upon reception of an interrupt to be issued in another way to be described later.

Figure 6:
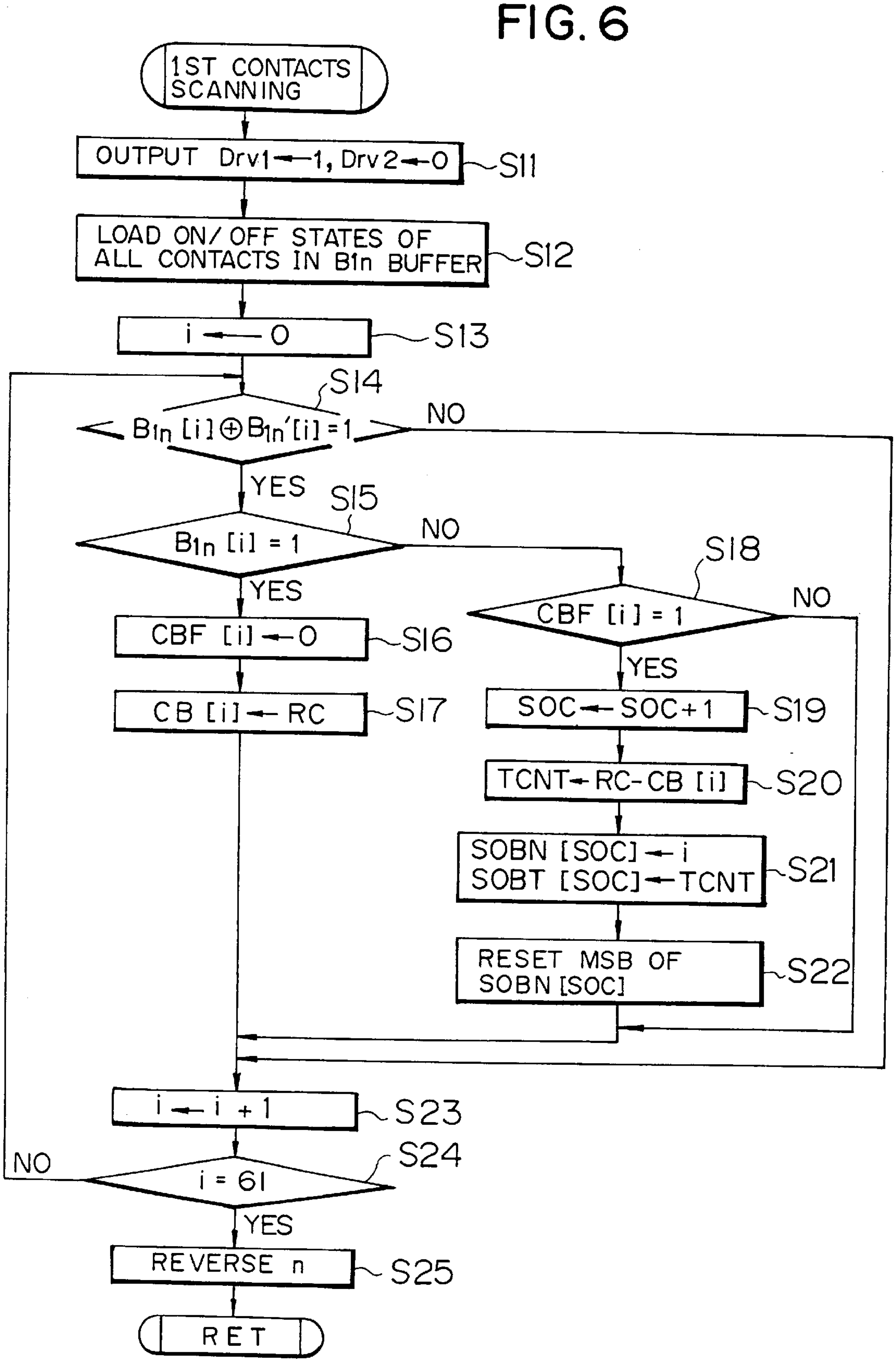
FIG. 6 is a flow chart showing the operation of first contact scanning to be executed by the keyboard CPU.

FIG. 6 is a flow chart of the first contact scanning process.

When the first contact scanning process starts, at step S11 "1" is stored in a register Drv1 to activate the drive line Drv1 connected to the first contacts, and "0" is stored in a register Drv2 to inactivate the drive line Drv2. These signals are outputted to activate the first drive line Drv1 and inactivate the second drive line Drv2, to prepare for detecting the states of the first contacts.

At step S12 the ON/OFF states of all the first contacts are detected, and the information of the ON/OFF states is stored in the first contact buffer register B1n. n of B1n is "0" or "1", and B1n is a buffer register for storing the current state of the first contacts.

At step S13, "0" is stored in a register i to prepare for the key scanning.

At step S14, it is checked whether an Exclusive-OR between B1n[i] and B1n'[i] is "1" or not. B1n[i] represents the current state of the first contacts of the i-th key, and B1n'[i] represents the previous state of the first contacts of the i-th key. If the Exclusive-OR is "1", it means that the previous and current states of the first contacts of the i-th ky are different, and if the Exclusive-OR is "0", it means that the previous and current states are the same.

If the Exclusive-OR is "1", the control follows a YES arrow to advance to step S15 whereat it is checked whether B1n[i] is "1", i.e., whether the first contacts of the i-th key are presently closed.

If B1n[i] is "1", it means that the key was depressed and the first contacts were closed. Therefore, the control follows a YES arrow to advance to step S16 whereat "0" is set to an i-th counter buffer flag CBF[i]. Namely, CBF[i]=0 means that the first contacts of the i-th key were closed.

At step S17, the count of the running counter RC is stored in an i-th counter buffer CB[i]. Namely, the time when the first contacts of the corresponding key were closed is stored. After step S17, the flow advances to step S23.

If the Exclusive-OR is not "1" at step S14, i.e., if the previous and current states of the first contacts are the same, the flow follows a NO arrow to immediately advance to step S23. Namely, if the state of the first contacts in concern has no change, further processing is not effected but the processing for the next key is carried out.

If the state B1n[i] of the first contacts of the key is not "1", i.e., if the first contacts were opened, the flow follows a NO arrow to advance to step S18.

At step S18 it is checked whether the i-th counter buffer flag CBF[i] is "1". As described at step S16 the counter buffer flag CBF is set to "0" when the first contacts are closed, and set to "1" when the second contacts are opened as will be later described. Namely, by checking whether CBF is "1", it is judged whether the second contacts were already made open.

If CBF[i]=1 and the second contacts were already made open, the release of the first contacts judged at step S15 means a release of the key, so that the flow follows a YES arrow to advance to step S19 whereat the serial-out counter SOC for sequentially designating the number is incremented.

At step S20 the value of the counter buffer CB[i] storing the information of the i-th key is subtracted from the count of the running counter RC at that time, and the result is stored in a touch count register TCNT. In this state, the counter buffer CB[i] stores the count of the running counter RC when the second contacts were made open, and so RC−CB[i] represents the count from the open state of the second contacts to the open state of the first contacts. Namely, a value corresponding to a key release speed is stored in TCNT.

At step S21, the key number i is stored in a note number area SOBN[SOC] of an SOC-th serial-out buffer, and the touch count TCNT is stored in the timer area SOBT[SOC] of the SOC-th serial-out buffer.

At step S22, the most significant bit MSB of the note area SOBN[SOC] of the SOC-th serial-out buffer is reset to indicate an occurrence of a key-off event.

After these processes, i is incremented at step S23 for scanning the first contacts of the next key.

At step S24 it is checked whether i=61. In this embodiment, the key numbers are 0 to 60 as shown in FIG. 4A. Therefore, the Judgment of i=61 means whether the processes for the last key have been completed. If not, the flow follows a NO arrow to return to step S14.

If i=61 at step S24 and the processes for the last key have been completed, the flow follows a YES arrow to advance to step S25 whereat n of the buffer register B1n is reversed to change the buffer for storing the current states of the first contacts to the buffer for storing the previous states of the first contacts, thereby interchanging the functions of the buffer registers. Thereafter, the control returns to the main flow.

Figure 7:
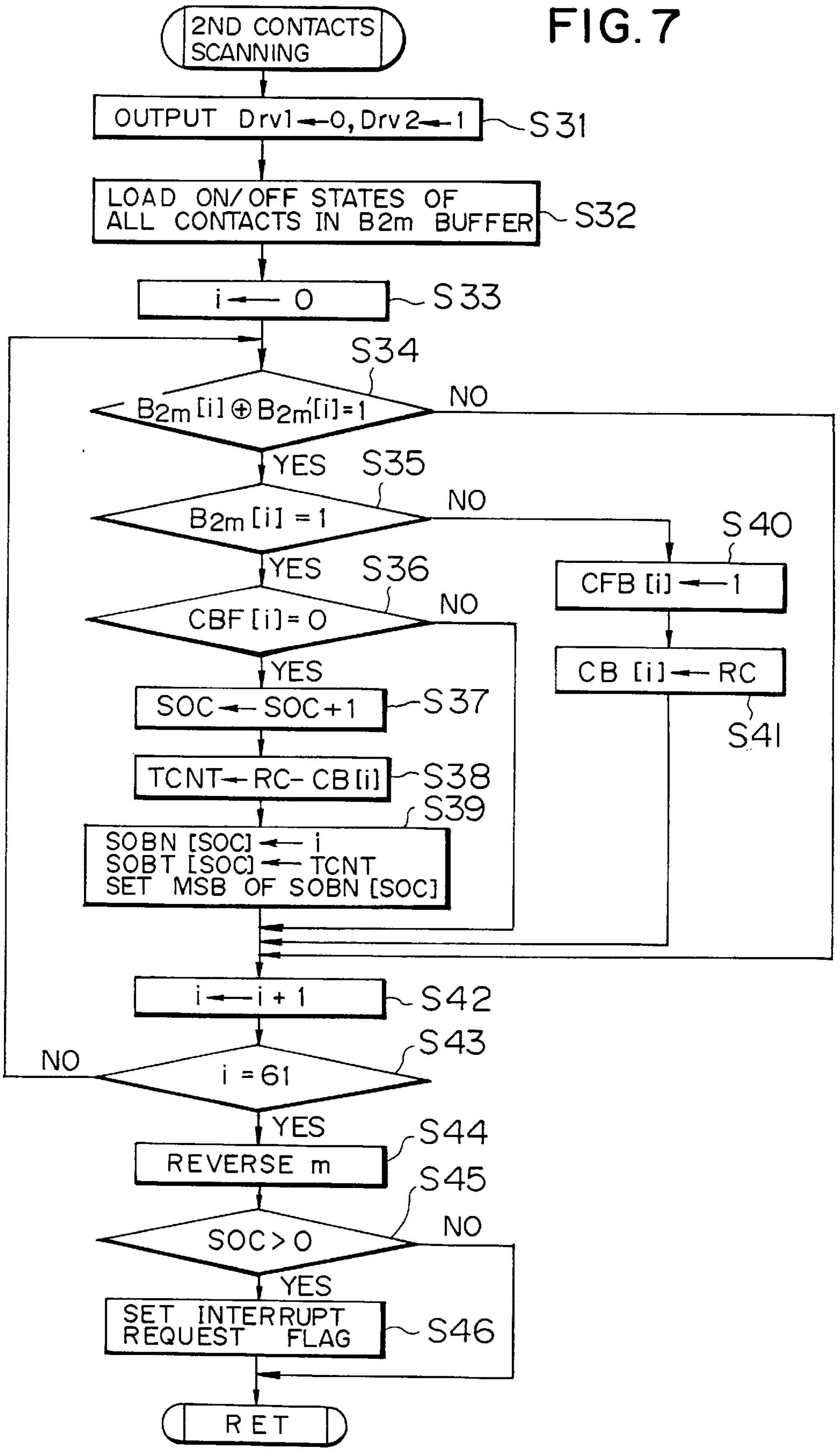
FIG. 7 is a flow chart showing the operation of second contact scanning to be executed by the keyboard CPU.

FIG. 7 is a flow chart of the second contact scanning process.

When the second contact scanning process starts, at step S31 "0" is stored in the register Drv1 to inactivate the first drive line Drv1 for scanning the second contacts, and "1" is stored in the register Drv2 to activate the second drive line Drv2. These signals are outputted to inactivate the first drive line Drv1 and activate the second drive line Drv2, to prepare for detecting the states of the second contacts.

At step S32 the ON/OFF states of all the second contacts are detected, and the information of the ON/OFF states is stored in the second contact buffer register B2m.

At step S33, “0” is stored in the register i to prepare for the second contact scanning.

At step S34, it is checked whether there is any change between the current and previous states of the second contacts of the i-th key. Namely, it is checked whether an Exclusive-OR between B2m[i] and B2m'[i] is “1” or not. If the Exclusive-OR is “1”, it means that the previous and current states of the second contacts of the i-th ky are different, showing an occurrence of an event of the second contacts.

If the Exclusive-OR is “1”, the control follows a YES arrow to advance to step S35 whereat it is checked whether B2m[i] is “1”, i.e., whether the second contacts of the i-th key are presently closed.

If B2m[i] is “1” indicating an occurrence of the second contact event and the presently close state of the second contacts, the control follows a YES arrow to advance to step S36 whereat it is checked if the i-th counter buffer flag CBF[i] is “0”.

As described with step S16 of FIG. 6, the count buffer flag CBF is set to “0” when the first contacts were made close. Therefore, if the count buffer flag CBF[i] is “0” at step S36, it means that the second contacts as well as the first contacts were made close.

In this case, the control follows a YES arrow to advance to step S37 whereat the register SOC is incremented. At step S38, the count of the running counter RC stored in the i-th count buffer CB[i] stored when the first contacts were made close is subtracted from the current count of the running counter RC, and the result is stored in the touch count register TCNT. Therefore, the touch count register TCNT stores the count corresponding to the time period from the close state of the first contacts to the close state of the second contacts.

At step S39, the key number i now in concern is stored in the note number area SOBN[SOC] of the serial-out buffer, and the touch count TCNT obtained at step S38 is stored in the timer area SOBT[SOC] of the serial-out buffer. In order to indicate a key depression, the most significant bit MSB of SOBN[SOC] is set. Thereafter at step S42 the key number i is incremented.

If the Exclusive-OR is not “1” at step S34, it means that there is no change of the second contacts of the i-th key. The control follows a NO arrow to immediately advance to step S42.

If B2m[i] is not “1” at step S35, it means that the second contacts are open. Therefore, the control follows a NO arrow to advance to step S40 whereat “1” is set to the count buffer flag CBF[i] to indicate a start of a key release operation.

At step S41, the count of the running counter RC at the time when the second contacts were opened is stored in the count buffer CB[i], to prepare for the operation of detecting a key release speed. Then, the control advances to step S42.

If the count buffer flag CBF[i] is not “0” at step S36, it means that the second contacts were closed although the first contacts were not closed. In this case, the close state of the second contacts is neglected, and the control follows a NO arrow to immediately advance to step S42.

At step S42, the key number i is incremented for the preparation of the next key scanning. At step S43 it is checked whether the value of the key number register i is “61”. Namely, it is checked whether the processes for the last key have been completed. If not, the flow follows a NO arrow to return to step S34.

If i=61 at step S43 and the processes for the last key have been completed, the flow follows a YES arrow to advance to step S44 whereat m of the buffer register B2m is reversed to interchange the functions of the two second contact buffer memories.

At step S45 it is checked whether the count of the serial-out counter SOC is positive or negative. If positive, it means that an event buffer has data. Therefore, the control follows a YES arrow to advance to step S64 whereat an interrupt request flag is set. If the count of SOC is “0”, there is no data to be sent and so the control bypasses to step S46. Thereafter, the control returns to the main flow.

Figure 8:
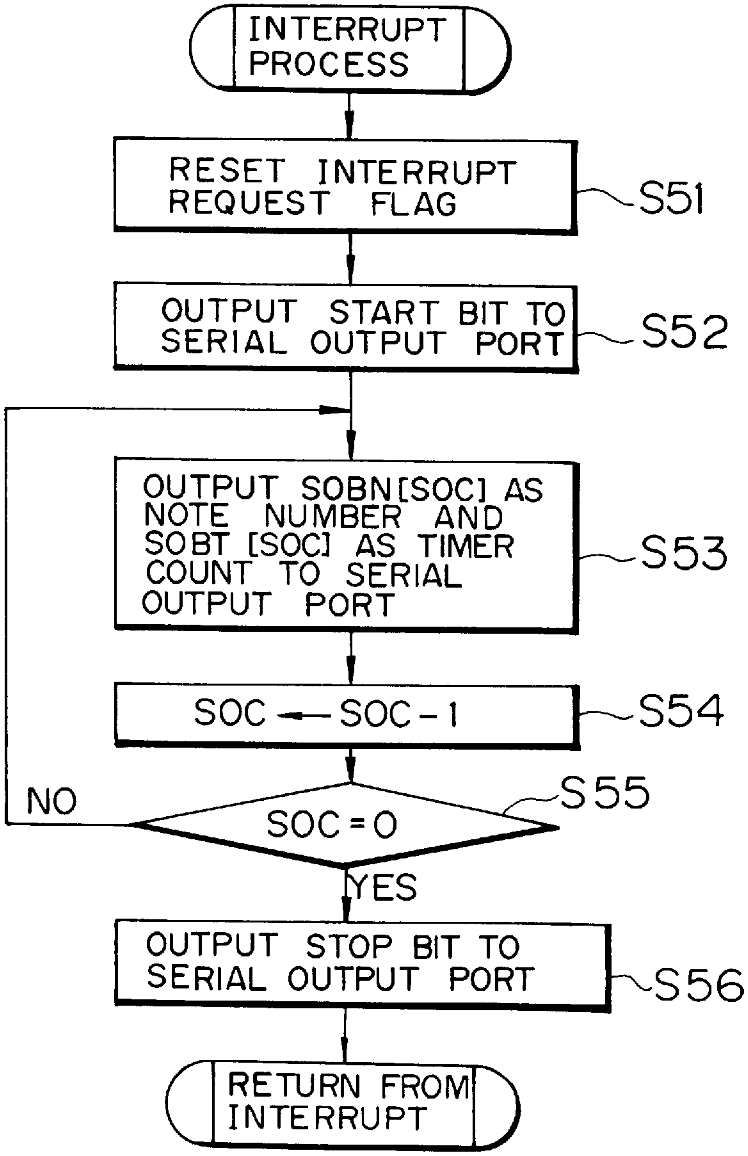
FIG. 8 is a flow chart showing the interrupt process to be executed by the keyboard CPU.

FIG. 8 is a flow chart showing the interrupt process to be executed by the keyboard CPU.

When the interrupt process starts, an interrupt request flag is reset for the issued interrupt at step S51. At step S52, a start bit is outputted to a serial data output port.

At step S53, after the start bit, data of SOBN[SOC] as the note number and SOBT[SOC] as the timer count is outputted to the serial data output port.

At step S54, the counter SOC is decremented to indicate that one set of data has been transferred.

At step S55, it is checked whether the count of SOC is “0”. If not, the control follows a NO arrow to return to step S53 to continue the data transfer.

If the count of SOC is “0”, the control follows a YES arrow to advance to step S56 whereat a stop bit is outputted to the serial data output port to indicate the end of the data transfer. Thereafter, the interrupt process is terminated, resuming the original routine.

In the above manner, data obtained by scanning the first and second contacts is sent from the keyboard CPU to the main CPU.

Figure 9:
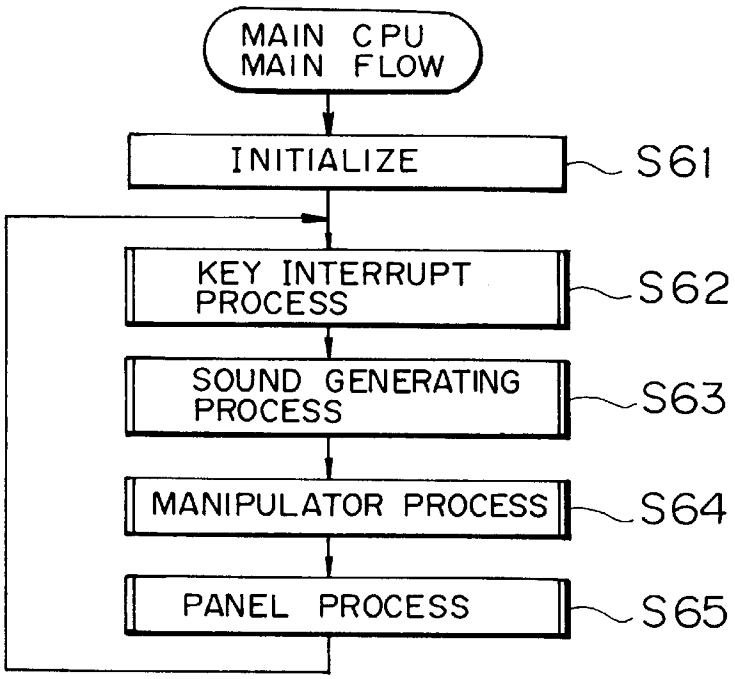
FIG. 9 is a flow chart showing the main procedure to be executed by the main CPU.

FIG. 9 is a flow chart showing the main procedure to be executed by the main CPU of the electronic musical instrument.

When the procedure starts, an initialization process is executed at step S61 to initialize registers and the like. Specifically, the keyboard CPU detects a key operation if any, and when a key interrupt occurs, the serial port is monitored by the main CPU.

At step S63, a sound generating process for a key operation is executed. At step S64, a manipulator process corresponding to an operation of a manipulator is executed. At step S65, a panel process corresponding to an operation of a panel is executed. Thereafter, the procedure returns to step S62.

Figure 10:
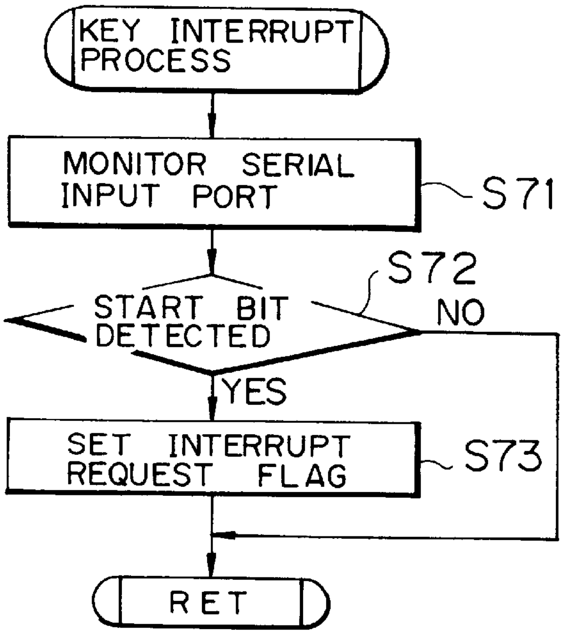
FIG. 10 is a flow chart showing the key interrupt process to be executed by the main CPU.

FIG. 10 is a flow chart showing the key interrupt process to be executed by the main CPU. When the process starts, the serial input port is monitored at step S71. At step S72, it is checked whether a start bit was detected at the serial input port. If the start bit was detected, the control follows a YES arrow to advance to step S73 whereat an interrupt request flag is set.

If the start bit is not detected, step S73 is bypassed. Thereafter, the process returns to the original routine.

Figure 11:
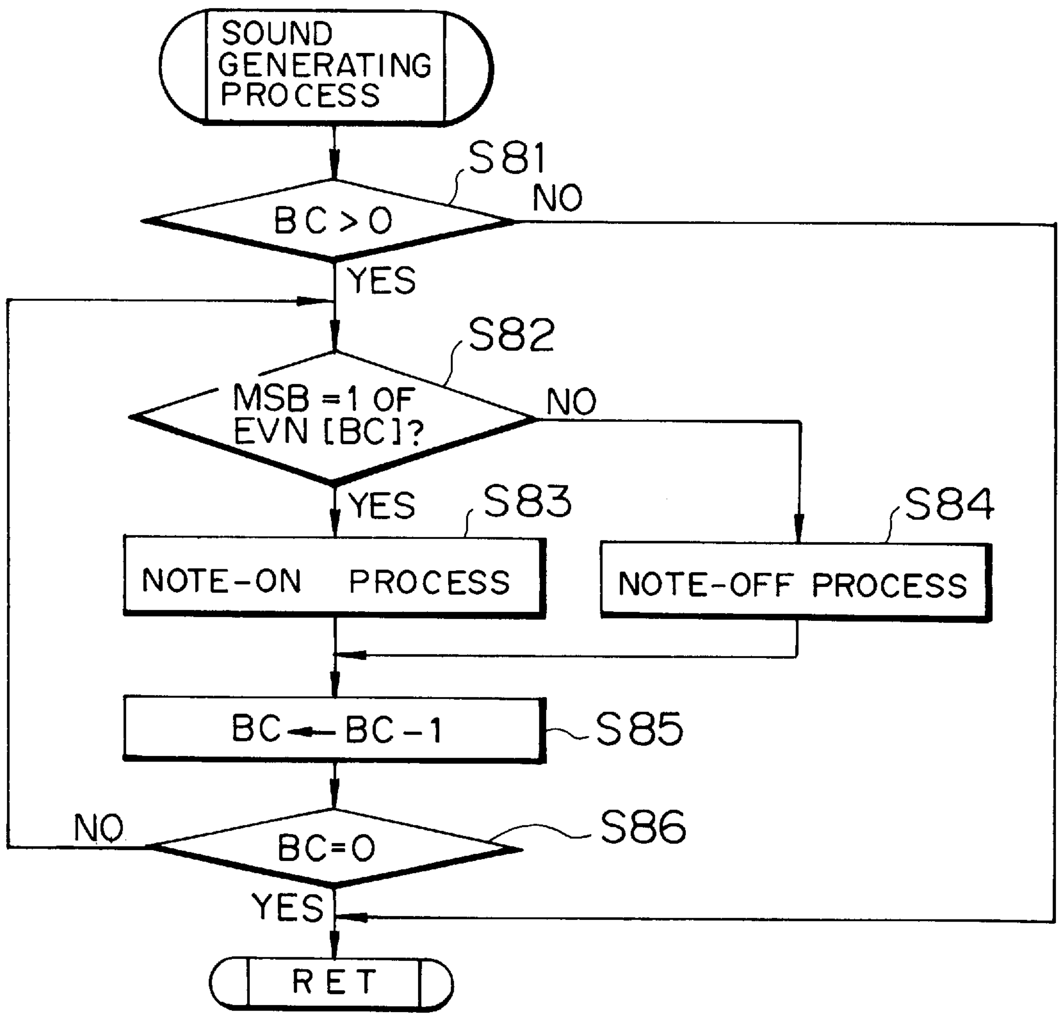
FIG. 11 is a flow chart showing the sound generating process to be executed by the main CPU.

FIG. 11 is a flow chart showing the sound generating process at the main CPU. When the process starts, it is checked at step S81 whether the count of a buffer counter BC is positive or negative. The buffer counter BC stores the number of key events such as key depression, key release and the like. BC=0 means that there is no key event.

If the count of the buffer counter BC is positive, it means there is a key event or events. The control then follows a YES arrow to advance to step S82 whereat it is checked whether the most significant bit MSB of a register ENV[BC]

representing a note number of the key event is "1" representative of a key-on.

If MSB of EVN[BC] is "1", the control follows a YES arrow to advance to step S83 whereat a note-on process is executed. If MSB is not "1" indicating a key-off event, the control follows a NO arrow to advance to step S84 whereat a note-off process is executed.

After these processes, the control advances to step S85 whereat the buffer counter BC is decremented.

At step S86, it is checked whether the count of the buffer counter BC is "0". If not "0", the control returns to step S82 because data is still present. If the count of the buffer counter BC is "0", the control follows a YES arrow to return to the original routine. If the count of the buffer counter BC is "0" at step S81, the control follows a NO arrow to immediately return to the original routine.

Figure 12:
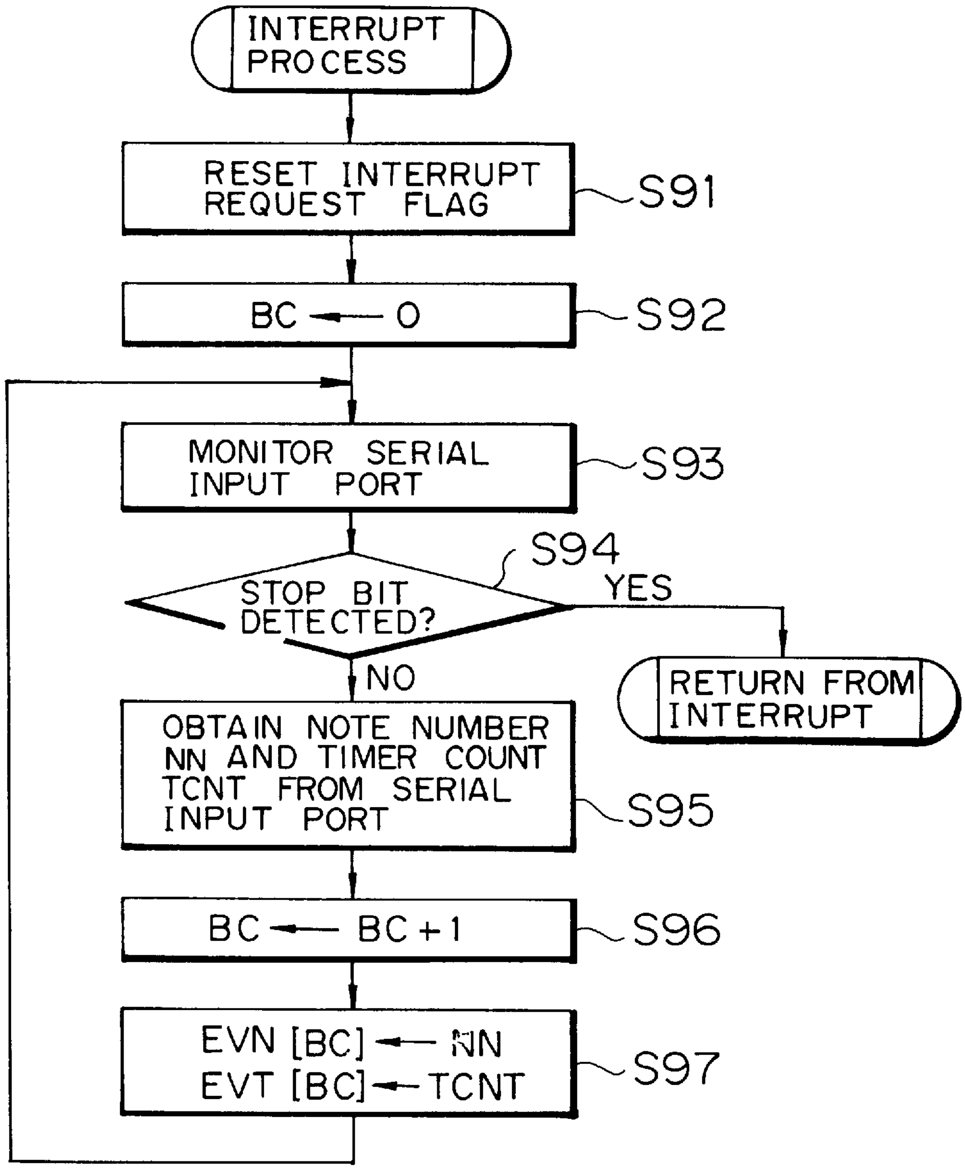
FIG. 12 s a flow chart showing the interrupt process to be executed by the main CPU.

FIG. 12 is a flow chart showing the interrupt process to be executed by the main CPU of the electronic musical instrument. When the process starts, the interrupt request flag is reset at step S91.

At step S92, "0" is loaded in the buffer counter BC to prepare for the following steps. At step S93, the serial input port is monitored.

At step S94, it is checked whether a stop bit was detected at the serial input port. If detected, the control follows a YES arrow to immediately return from the interrupt process. If not detected, the control follows a NO arrow to advance to step S95.

At step S95, the next data of the note number NN and timer count TCNT is obtained from the serial input port. The note number NN indicates the pitch of a sound to be generated, and the timer count TCNT indicates a count corresponding to the touch speed. In accordance with these data, the main CPU executes a process of generating a sound. At step S96, the buffer count BC is incremented, and thereafter the control advances to step S97 whereat the note number is stored in the register EVN[BC] for storing the note number and the touch count TCNT is stored in the register EVT[BC] for storing the counter number of the event. Thereafter, the control returns to step S93.

In the above manner, when an interrupt request is issued from the keyboard CPU, the main CPU processes this interrupt to generate a corresponding sound. In the flow chart of the above embodiment, an interrupt request is immediately processed upon occurrence of the request. Instead, if an interrupt request is issued from the keyboard CPU, the main CPU may respond to it at a suitable timing for its operation to execute the interrupt process.

The present invention has been described in connection with the preferred embodiment. The present invention is not intended to be limited to the above embodiment only. For example, the similar advantageous effects can be also obtained when the invention is applied to tone color select switches or the like. It is obvious that various changes, modifications, combinations and the like can be made by those skilled in the art.

We claim:

1. A keyboard system for an electronic musical instrument comprising:

a keyboard having a number of keys;

a keyboard central processing unit (CPU) coupled to said keyboard;

switching means connected to each key of said keyboard;

a pull-up resistor serially connected to each said switching means;

means for applying voltage to a serial circuit of each said switching means and each said pull-up resistor; and means for independently connecting a signal obtained at an intersection point between each said switching means and each said pull-up resistor to respective separate inputs of said keyboard CPU.

2. A keyboard system for an electronic musical instrument according to claim 1, further comprising a printed circuit board mounted on said keyboard, said keyboard CPU and said pull-up resistors being mounted on said printed circuit board.

3. A keyboard system for an electronic musical instrument according to claim 1, wherein said voltage applying means includes a plurality of drive lines connected to said CPU, and said switching means includes a plurality of switches provided for each key, each switch being connected to each said pull-up resistor at one end thereof, and connected to each drive line at the other end thereof.

4. A keyboard system for an electronic musical instrument according to claim 3, wherein said voltage applying means includes a power source line interconnecting said CPU and each said pull-up resistor.

5. A keyboard system for an electronic musical instrument according to claim 3, wherein said CPU alternates activation of each said drive line whereby only a single drive line is activated at a given time.

6. A keyboard system for an electronic musical instrument according to claim 3, wherein when one of said switches is closed, said closed switch and said pull-up resistor form a bi-directional circuit.

7. A keyboard system for an electronic musical instrument comprising:

a keyboard having a number of keys, wherein each said key has a key switch and an independent output; and a CPU having a number of input ports to which a corresponding number of said keys are connected, wherein each said independent output is connected to a CPU input port and said CPU is capable of sequentially enabling each said input port.

8. A keyboard system for an electronic musical instrument according to claim 7, wherein a resistor serially connected to each key switch is provided, and each said input port of said CPU is connected to an interconnection point between said key switch and said resistor.

9. A keyboard system for an electronic musical instrument according to claim 8, wherein said key switch is a two-make switch having two pairs of contacts connected in series with said resistor.

10. A keyboard system for an electronic musical instrument according to claim 9, further includes a first drive line connected to one contact of one of said two pairs of contacts of each of said two-make switches of all keys, a second drive line connected to one contact of the other of said two pairs of contacts of each of said two-make switches of all keys, and a third drive line connected one end of each of said resistors of all keys.

11. A keyboard system for an electronic musical instrument according to claim 10, wherein said CPU alternates activation of said first and second drive lines connected to one end of each said contact whereby only one of said first and second drive lines is activated at a given time.

12. A method of controlling a keyboard system for an electronic musical instrument having a keyboard and a keyboard CPU, said keyboard having a number of keys each provided with a serial circuit including a key switch, a resistor and an independent output, said method comprising the steps of:

applying a predetermined voltage to each group of said serial circuits; and detecting voltages at independent interconnection points within said serial circuits, by sequentially scanning said interconnection points.

13. A method according to claim 12, wherein each of said number of keys is provided with another key switch connected in parallel with said key switch and having a common output with said key switch, and said scanning and detecting step includes detecting said voltage at each of said independent interconnection points by scanning ones of said two key switches and by scanning the others of said two key switches.

* * * * *

UNITED STATES PATENT AND TRADEMARK OFFICE

CERTIFICATE OF CORRECTION

PATENT NO. : 5,883,327

DATED : March 16, 1999

INVENTOR(S) : Kosei Terada, et al.

It is certified that error appears in the above-indentified patent and that said Letters Patent is hereby corrected as shown below:

On the title page, item[56], insert the following:

FOREIGN PATENT OR PUBLISHED FOREIGN PATENT APPLICATION

| | | DOCUMENT NUMBER | | | | | | | PUBLICATION DATE | COUNTRY OR PATENT OFFICE | CLASS | SUBCLASS | TRANSLATION | |
|---|---|---|---|---|---|---|---|---|---|---|---|---|---|---|
| | | | | | | | | | | | | | YES | NO |
| | JP | B | 58 - | 2 | 6 | 0 | 3 | 9 | 05/31/83 | Japan | | | | |
| | JP | A | 60 - | 2 | 4 | 5 | 0 | 2 2 | 12/04/85 | Japan | | | | |
| | JP | B | 63 - | 1 | 1 | 6 | 9 | 1 | 03/15/88 | Japan | | | | |
| | UM | JP - | A | 2 - | 8 | 8 | 6 | 9 7 | 07/13/90 | Japan | | | | |
| | JP | - A | 3 - | 4 | 8 | 1 | 8 | 0 | 03/01/91 | Japan | | | | |
| | | | | | | | | | | | | | | |
| | | | | | | | | | | | | | | |
| | | | | | | | | | | | | | | |

Signed and Sealed this

Twenty-sixth Day of October, 1999

*Attest:*

Q. TODD DICKINSON

*Attesting Officer*

*Acting Commissioner of Patents and Trademarks*